United States Patent [19]
Snyder et al.

[11] 3,934,702
[45] Jan. 27, 1976

[54] ARTICLE TRANSFER APPARATUS

[75] Inventors: Alan Kent Snyder, River Forest; Arthur D. Schmidt, Elgin, both of Ill.; Seldon T. Foote, deceased, late of South Bend, Ind.; by Robert R. Clipp, executor

[73] Assignee: Chicago Display Company, Melrose Park, Ill.

[22] Filed: Sept. 13, 1973

[21] Appl. No.: 396,889

[52] U.S. Cl. ................. 198/20; 198/179; 214/1 BC
[51] Int. Cl.² .......................................... B65G 47/00
[58] Field of Search ...... 198/20, 179, 40; 214/1 BC, 214/1 BB, 1 PE, 1 BD, 6 P; 294/115, DIG. 2; 271/85; 53/247

[56] References Cited
UNITED STATES PATENTS

| | | | |
|---|---|---|---|
| 2,794,537 | 6/1957 | Holliday | 198/179 |
| 2,932,378 | 4/1960 | Smith | 198/179 X |
| 3,120,892 | 2/1964 | Henning et al. | 198/179 |
| 3,643,293 | 2/1972 | Rejsa | 198/179 X |
| 3,747,920 | 7/1973 | Linkus | 271/85 |
| 3,780,492 | 12/1973 | Corderoy | 53/247 |

*Primary Examiner*—Robert J. Spar
*Assistant Examiner*—James M. Slattery
*Attorney, Agent, or Firm*—Hume, Clement, Brinks, Willian, Olds & Cook, Ltd.

[57] ABSTRACT

The invention provides improved apparatus for transferring articles from a transfer station to a receiving station which comprises gripping members including oppositely disposed elastic bands for gripping the sides of an article to be transferred, engagement members for displacing the elastic bands toward one another to grip the sides of the article at the transfer station, and transfer members for transferring the gripping members from the transfer station to a receiving station. The use of the oppositely disposed elastic bands renders the apparatus especially suitable for transferring fragile articles such as bakery products from a transfer station to a package or packaging station.

8 Claims, 7 Drawing Figures

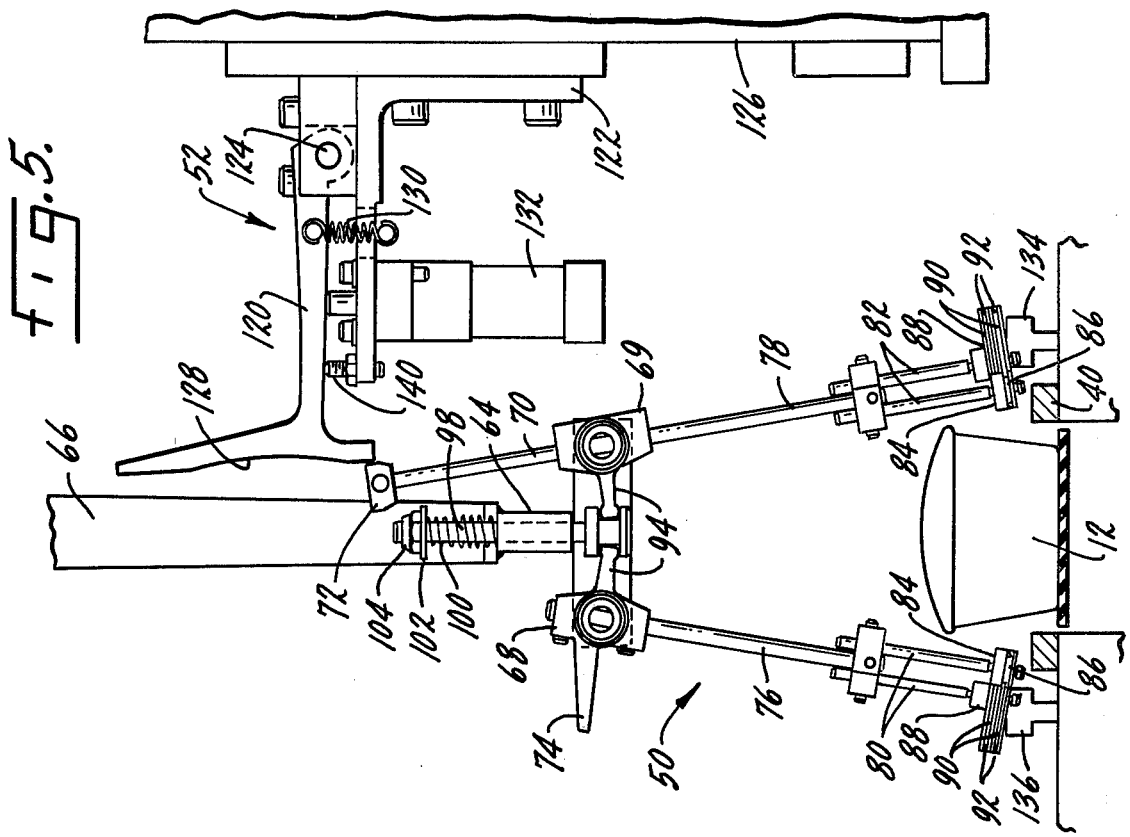
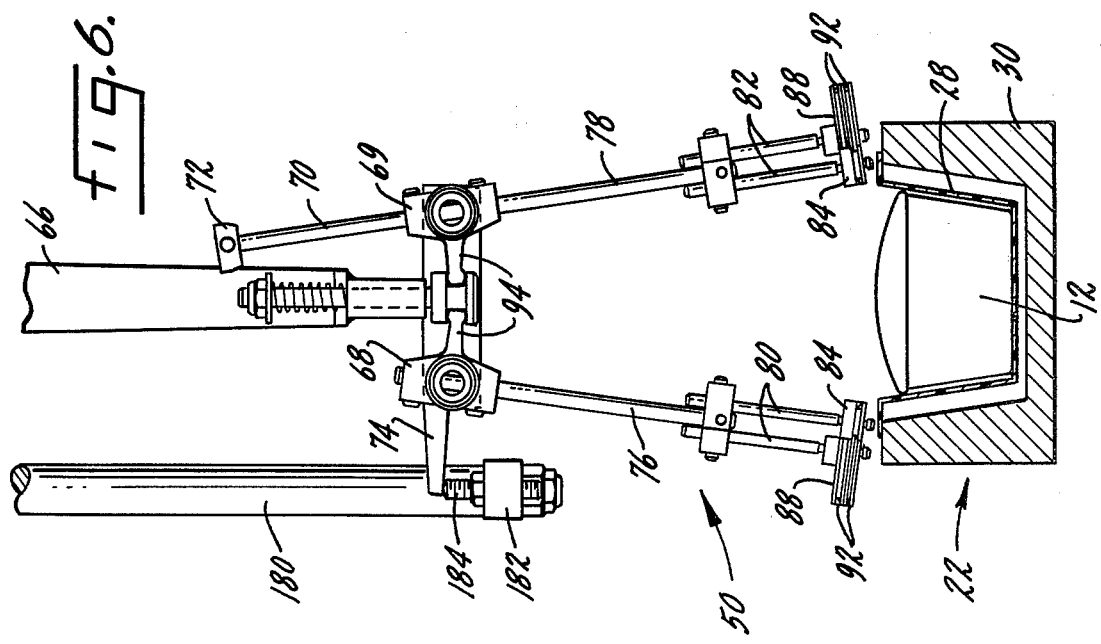

ARTICLE TRANSFER APPARATUS

The present invention relates to improved apparatus for transferring articles from a transfer station to a receiving station, and more particularly to improved transfer apparatus which is particularly adapted to the handling of fragile articles.

The handling of fragile articles, particularly readily crushable articles such as baked goods, has long presented serious difficulties, and mechanization of such handling has largely been avoided. Thus, in the case of baked goods, such as cupcakes and the like, even mass production in large quantities has required the goods to be placed into packages by hand. Of course, such hand transfer involves a large amount of labor expense, while it does not completely eliminate the possibility of product being damaged by improper handling.

Generally, the present invention provides improved apparatus for transferring articles from a transfer station to a receiving station without requiring the use of the human hands. Such apparatus comprises gripping means including oppositely disposed elastic bands for gripping the sides of an article to be transferred, engagement means for displacing the elastic bands toward one another to grip the sides of the article at the transfer station, and transfer means for transferring the gripping means from the transfer station to a receiving station. Because the article is gripped at the sides by elastic bands, damage to even delicate articles, such as freshly baked cupcakes, is avoided.

The invention, its construction and method of operation, together with the objects and advantages thereof, will be best understood by reference to the following detailed description of a preferred embodiment, taken in conjunction with the accompanying drawings, in which:

FIG. 1a is a fragmentary, detail view of a portion of the package conveyor, as indicated by 1a in FIG. 1;

FIG. 5 is a partial elevation view of the apparatus of FIG. 2 at the transfer station; and FIG. 6 is a partial elevation view of the apparatus shown in FIG. 2 at the receiving station.

Figure 1:
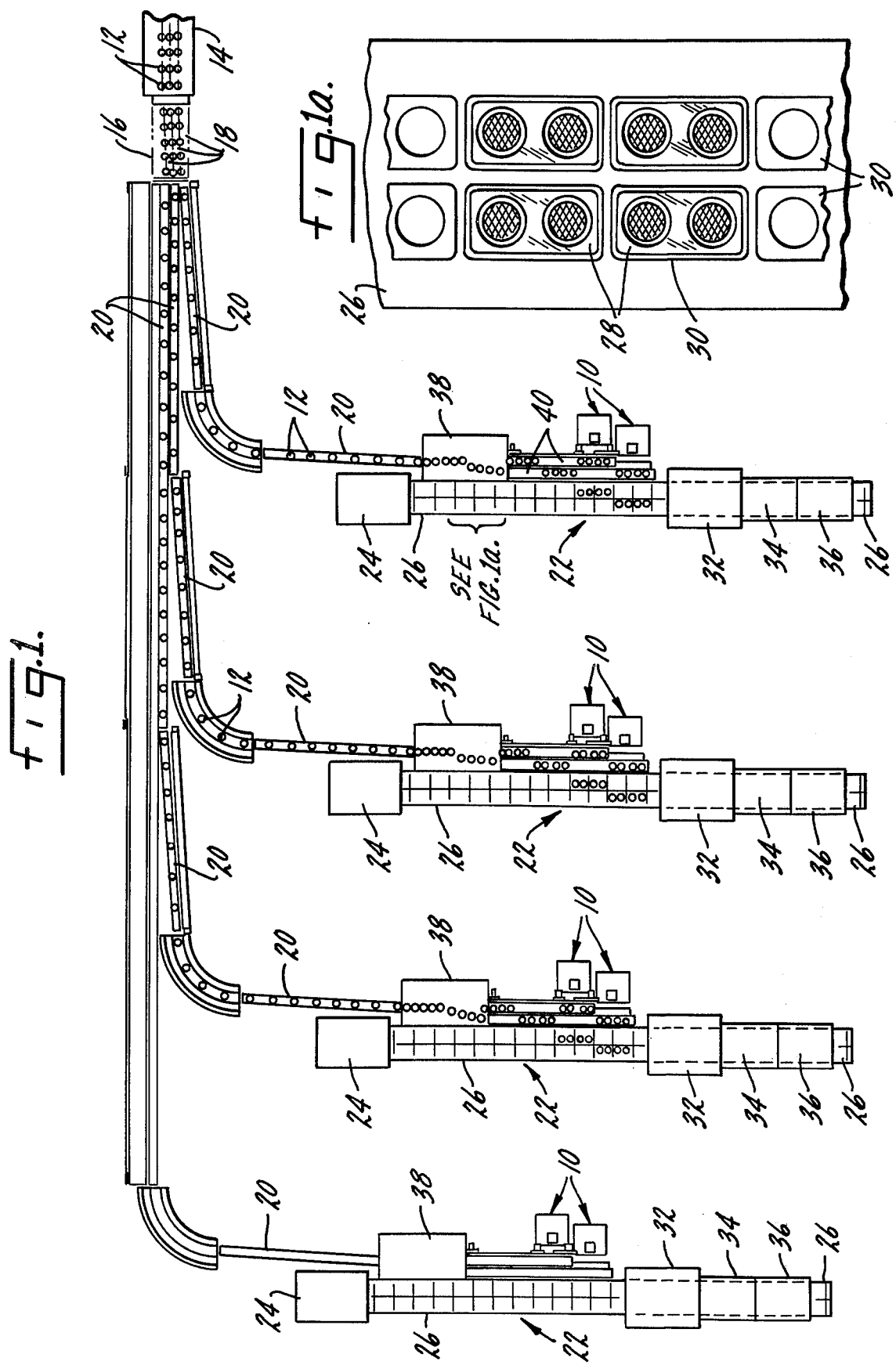
FIG. 1 is a plan view of a cupcake packaging system embodying the present invention.

Referring to FIG. 1, the apparatus of the present invention is illustrated in conjunction with a system for packaging cupcakes into a package such as that shown in U.S. Pat. No. 215,271. In FIG. 1, a transfer apparatus in accordance with the present invention is generally indicated by reference numeral 10. In the apparatus of FIG. 1, fresh baked cupcakes 12 are delivered from the final processing step (such as an icing machine or the like) along a conveyor belt 14 to an alignment conveyor 16. In the embodiment shown, the alignment conveyor simply comprises a series of chutes 18 which deliver the cupcakes to a series of single-row conveyors 20. As can be seen in the drawing, each of these single-row conveyors 20 leads to a packaging station, generally indicated by reference numeral 22. As shown in FIG. 1, only three of the packaging stations 22 are in operation, the station 22 to the far left being held as an auxiliary station. The chutes 18 on the alignment conveyor 16 can be shifted in order to deliver cupcakes 12 to any three packaging stations 22, so that any packaging station 22 may be shut down in the event of a malfunction or during routine maintenance.

The packaging stations 22 are all alike, and each comprises a package storage and denesting apparatus 24, which retains the packages in nested condition, and delivers them to a package conveyor 26. The package conveyor 26 carries cupcake packages 28 in individual receptacles 30, as shown in FIG. 1a. The package conveyor 26 moves intermittently in coordination with the transfer apparatus 10, so that the conveyor 26 is stopped when cupcakes are delivered to the packages 28, and moves to locate a second series of packages 28 in the proper alignment with the transfer apparatus 10, as hereinafter described.

After cupcakes 12 have been placed into the packages 28 by the transfer apparatus 10, they are delivered to a covering apparatus 32, which heat seals a sheet of plastic film to the top of the packages 28. The packages are then delivered to a cutting machine 34, where the plastic sheet that has been applied to the tops of the packages is cut to separate the packages, and then to a labeling machine 36, which places labels on top of the packages. Subsequently, the closed packages are removed from a downstream portion of the conveyor 26.

The cupcakes themselves are delivered by the conveyors 20 to a distributing conveyor 38 which alternately distributes equal numbers of cupcakes to parallel transfer conveyors 40. The distributing conveyor 38 is a commercially available apparatus, which utilizes a light source and photocell to count the cupcakes and separate equal numbers into two separate rows.

The cupcakes are delivered by the transfer conveyors 40 to transfer stations at each transfer apparatus 10. As shown in FIG. 1, each transfer conveyor 40 delivers cupcakes to an individual transfer apparatus 10. As hereinafter described, the transfer apparatus 10 properly orients the cupcakes with respect to one another and transfers them to the packages 28 on the package conveyor 26. A gate (not shown) is provided upstream of the transfer apparatus 10, so that cupcakes are not delivered to the transfer apparatus 10 except when the apparatus 10 is ready to receive them.

Figure 2:
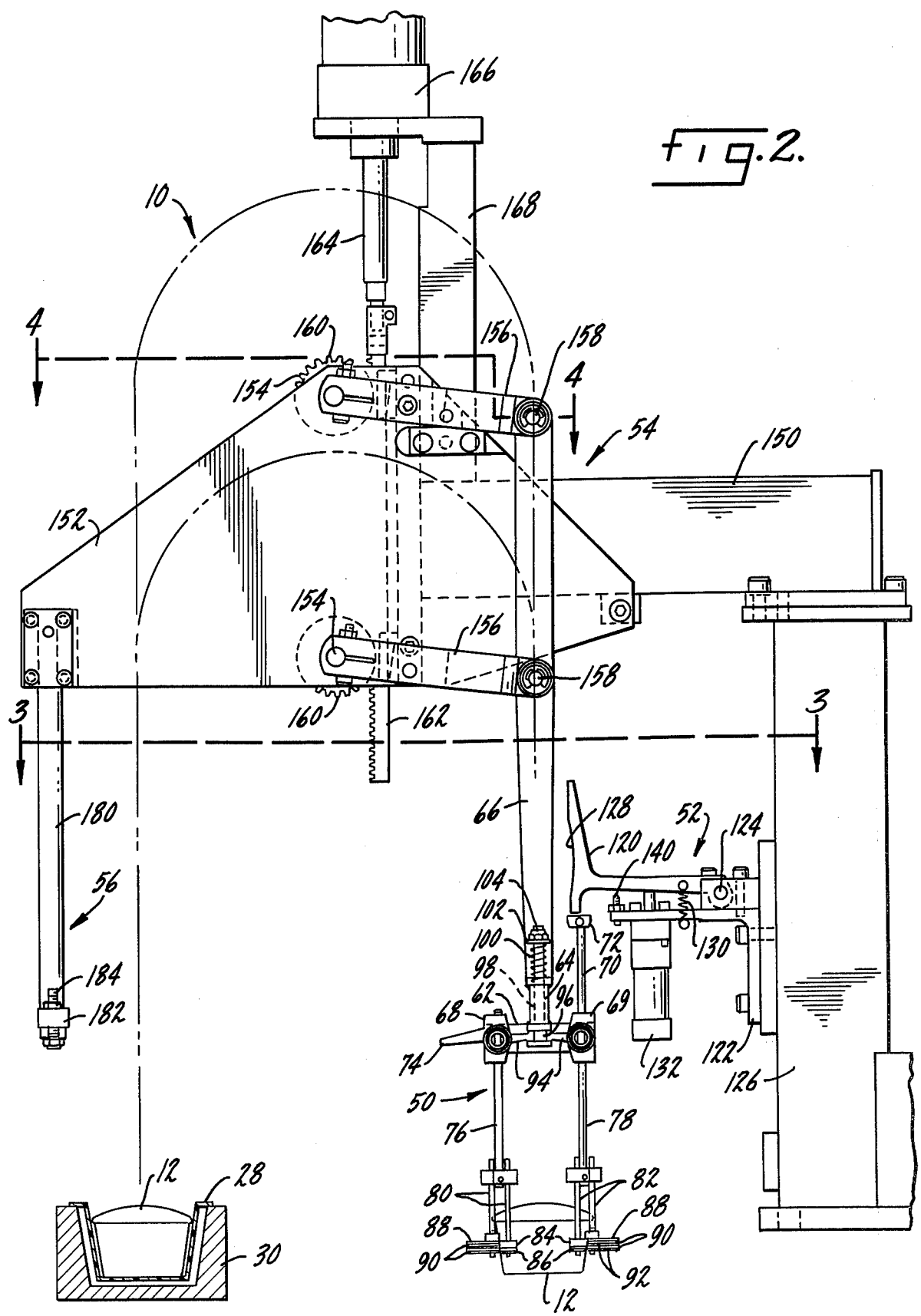
FIG. 2 is an elevation view of an article transfer apparatus embodying the present invention.

Referring to FIG. 2, the transfer apparatus generally 10 comprises a gripping assembly generally 50, engagement means generally 52, a transfer assembly generally 54, and disengagement means, generally 56. In the embodiment shown, the gripping assembly 50 is constructed to simultaneously position and grip four cupcakes 12, as shown in FIG. 3.

Figure 3:
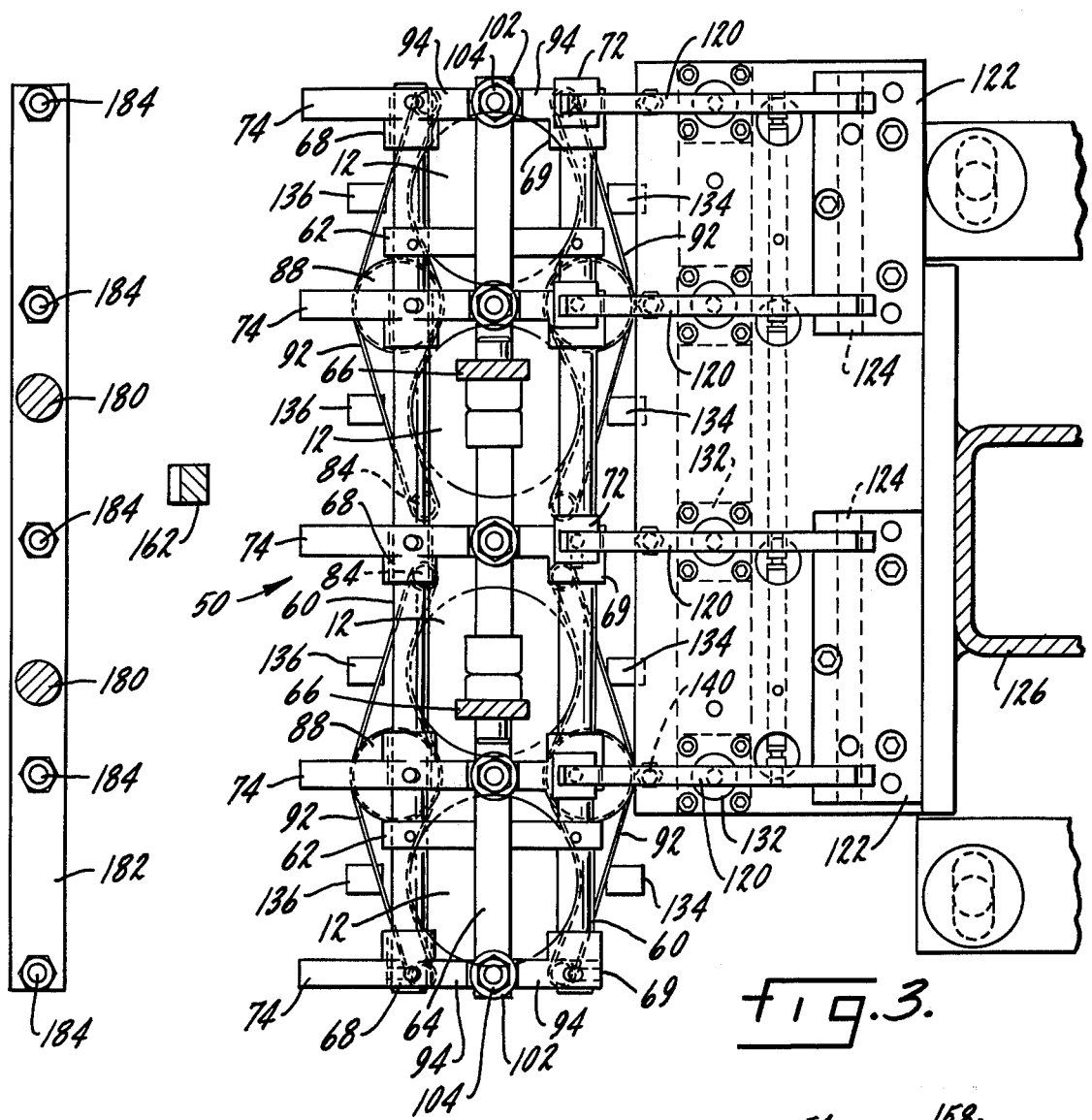
FIG. 3 is a plan view taken along line 3—3 of FIG. 2.

Referring to FIGS. 2 and 3, the gripping assembly 50 comprises a pair of horizontal bars 60 which are affixed to a pair of transverse bars 62. The transverse bars are, in turn, affixed to a central supporting bar 64 which is affixed to a pair of vertical bars 66 associated with the transfer assembly 54.

The horizontal bars 60 have a plurality of oppositely disposed left-hand and right-hand connecting heads 68, 69, respectively, journalled thereto. For reasons that will hereinafter become clear, the number of pairs of connecting heads 68, 69 equals the number of cupcakes to be handled by the gripping assembly plus one. Thus, in the embodiment shown, there are five pairs of connecting heads 68, 69.

As shown in FIGS. 2, 5, and 6, the right-hand connecting heads 69 each have a rod 70 projecting upwardly therefrom, the rod 70 having a cam following head 72 on its upper end. This cam following head 72 cooperates with the engagement means 52 as hereinafter described. Similarly, the left-hand connecting heads 68 have disengagement levers 74 projecting outwardly therefrom. These disengagement levers 74 cooperate with the disengagement means 56 as hereinafter described.

Each of the connecting heads 68, 69 has a rod 76, 78, respectively, extending downwardly therefrom. Each of these rods 76, 78, in turn, has a second parallel rod 80, 82, attached thereto. The second rods 80, 82 associated with the connecting heads 68, 69, at the ends of the gripping assembly 50 each have a small, horizontal disc 84 having a circumferential groove 86 therein. As shown in FIG. 3, the alternate pairs of second rods 80, 82, carry large discs 88 having a pair of locating grooves 90. These large discs 88 are eccentrically connected to the second rods 80, 82, and are positioned so that the centers of the large discs 88 are outboard of the centers of the small discs 84, as can be seen in FIGS. 2 and 3. As shown in FIG. 3, the central pair of connecting heads 68, 69 each has a pair of second rods 80, 82, each of which carries a small disc 84.

As shown in FIG. 3, each pair of adjacent discs 84, 88 carries an elastic band 92 in the locating grooves 86, 90. This elastic band is normally under a slight amount of tension. Any elastic material may be employed, and conventional rubber bands are quite suitable. The only requirement is that the width and elasticity of the elastic bands 92 be such that they be capable of lifting cupcakes 12 without causing any damage thereto.

As best shown in FIG. 2, each of the connecting heads 68, 69, has an inwardly projecting engagement lever 94. These engagement levers 94 are fitted into a slot 96 in a vertically movable engagement pin 98. As shown in FIG. 2, the engagement pins 98 pass through the central supporting bar 66, and are each upwardly biased by a coil spring 100 positioned between the bar 62 and a washer 102 at the upper end of the engagement pin 98. The upper end of the engagement pin 98 is threaded, and the washer 102 is held in a place by a nut 104.

As can be seen in FIG. 2, by biasing the engagement pin 98 in an upward direction, the coil spring 100 also biases the rods 76, 78 toward one another by biasing the engagement levers 94 in an upward direction, thereby rotating the connecting heads 68, 69. As shown in FIG. 3, when the rods 76, 78 are biased toward one another, the elastic bands 92 contact the sides of the cupcakes 12 so that they may be lifted by the transfer apparatus 10.

The engagement means 52 comprises a plurality of cam levers 120, one such cam lever being associated with each cam following head 72. The cam levers 120 are hingedly mounted to supporting brackets 122 at hinges 124. The supporting bracket 122 is, in turn, secured to an upright supporting stanchion 126 which supports the entire transfer assembly 10. The cam lever 120 has a generally vertical cam surface 128, and is downwardly biased by a spring 130 connected between the cam lever 120 and the supporting bracket 122.

The cam lever 120 may be upwardly displaced by an air cylinder 132. The air cylinder 132 operates in response to a signal received from a photocell 134, which is opposite a light source 136 as shown in FIGS. 3 and 5. Thus, the air cylinder 132 is activated when a cupcake 12 interrupts the beam between the light source 136 and photocell 134. This disengages the cam surface 128 from the cam following head 72, as can be seen by comparing FIGS. 5 and 2. The bracket 122 also carries an adjustable stop screw 140 upon which the cam lever 120 rests in its downwardmost position as shown in FIG. 5.

Figure 4:
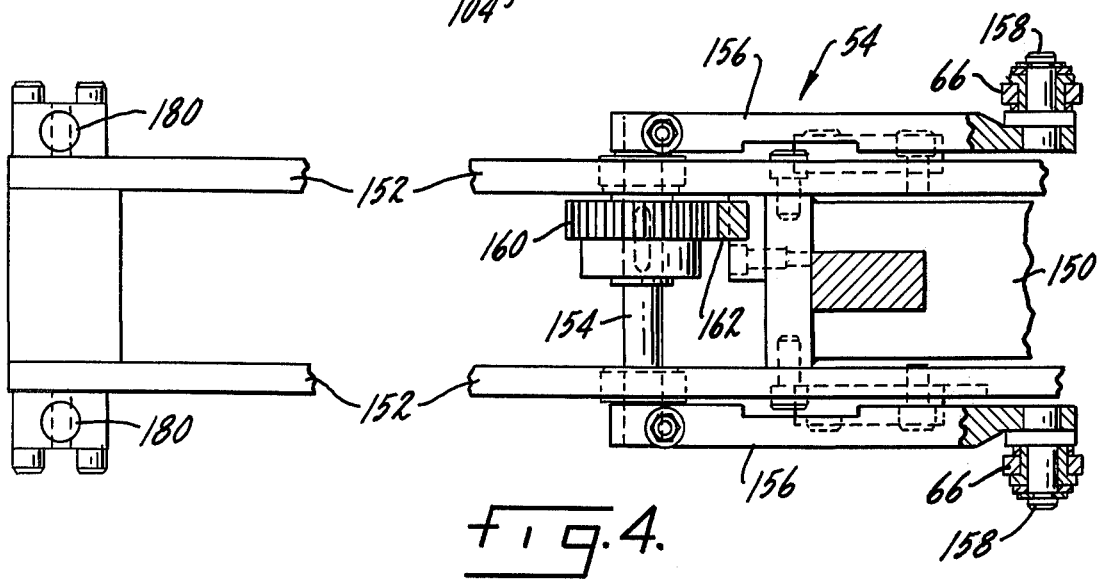
FIG. 4 is a plan view taken along line 4—4 of FIG. 2.

Referring again to FIG. 2, the transfer assembly 54 is supported on a cantilever arm 150, and includes a pair of parallel, vertical mounting plates 152. The mounting plates 152 have a pair of horizontal shafts 154 journalled thereto, as can be seen in FIGS. 2 and 4. These shafts have a pair of parallel transfer levers 156 mounted on their ends outboard of the mounting plates 152. The transfer levers 156 are, in turn, journalled to pins 158 extending outwardly from the vertical bar 66. As can be seen from FIG. 2, a parallelogram is formed by the ends of the shafts 154 and the pins 158, so that counterclockwise rotation of the shafts 154 (as shown in FIG. 2) will move the vertical bars 66 and the entire gripping assembly 50 through an arcuate path to position the gripping assembly above the package conveyor 26, as shown in FIG. 6.

In order to permit such rotation of the shafts 154, eah shaft 154 has a pinion gear 160 mounted thereon. These pinion gears 160 engage a vertical rack 162, which, in turn, is connected to a rod 164 extending downwardly from a pneumatic cylinder 166. The pneumatic cylinder 166 is mounted on a stanchion 168 connected to the cantilever arm 150. Thus, actuation of the pneumatic cylinder 166 produces vertical movement of the rack 162 rotating the pinion gears 160, and transferring the entire gripping assembly 50 from the position shown in FIG. 2 to that shown in FIG. 6.

Referring to FIGS. 2, 3, and 6, the disengagement means 56 simply comprises a pair of rods 180 extending downwardly from the mounting plates 152. These rods 180 carry a horizontal bar 182 having a plurality of releasing screws 184 extending upwardly therefrom. These releasing screws 184 are aligned with the disengagement levers 74 on the gripping assembly 50, so that these levers 74 will contact the screws 184 as shown in FIG. 6. This contact produces upward movement of the disengagement levers 74, causing the connecting heads 68, 69 to rotate, moving the elastic bands 92 away from one another, and releasing the cupcake 106 so that it is dropped into a package 28. The releasing screws 184 are adjustable in order to provide the desired amount of travel of the disengagement levers 74.

Referring to FIG. 1, in operation, freshly baked and iced cupcakes 12 are delivered to the transfer conveyors 40 via the conveyor belt 14, the alignment conveyor 16, the conveyors 20, and the distributing conveyor 38. A gate (not shown) prevents the delivery of cupcakes 12 into a position below the gripping assemblies 50.

Referring to FIG. 2, assuming that the gripping assembly 50 has just completed the operation of depositing a group of cupcakes 12 into packages 28, the pneumatic cylinder 166 is actuated to move the rack 162 in a downward direction, rotating the shafts 154 in a clockwise direction (as seen in FIG. 2), and transferring the gripping assembly 50 through an arcuate path into the position shown in FIG. 5. As the gripping assembly 50 descends through its arc, the cam following head 72 contacts the cam surface 128, and slides along this surface, until the gripping assembly 50 comes to rest in the position shown in FIG. 5. In order to insure that the gripping assembly 50 stops in the proper position, suitable stops may be provided for the transfer levers 156 or for the rod 164 leading to the pneumatic cylinder 166.

With the transfer assembly 50 in the position shown in FIG. 5, the gate (not shown) is opened, permitting cupcakes 12 to be delivered along the transfer conveyor 40 between the second rods 80, 82 and discs 84, 88 carrying the elastic bands 92, as shown in FIG. 5. The first cupcake travels the entire length of the gripping assembly 50, until it reaches the position indicated by the cupcake 12 at the bottom of FIG. 3. As it passes into this position, it interrupts the light beam between the photocell 134 and the light source 136. This interruption of the light beam produces a signal which actuates the air cylinder 132, displacing the cam lever 120 in an upward direction, and permitting the first pair or large discs 88 to move inwardly to the position shown in FIG. 3. A signal from the first photocell 134 also activates the next photocell 134 upstream.

As the next cupcake passes into the gripping assembly 50, the interruption of the light beam from the next light emitter and photocell 136, 134, respectively, actuates the next air cylinder 132 upstream, moving two pairs of small discs 84 toward one another, so that the second cupcake 12 is held in position and a stop is provided for the third cupcake. This procedure is repeated as the third and fourth cupcakes come into position, the arrival of each being sensed by the interruption of a light beam between a photocell 134 and light source 136. After the last cupcake 12 is in position, the cupcakes are held in a predetermined spatial relationship with respect to one another, as shown in FIG. 3. The device is now ready to transfer the cupcakes to a receiving station, in this instance defined by the packaging station 22.

As previously mentioned, the package conveyor 26 moves intermittently, and is stopped while cupcakes are being deposited in packages 28. After the gripping assembly 50 begins to move from the position shown in FIG. 6 to the position shown in FIG. 5, the package conveyor 26 begins to move, and stops as soon as two more cupcakes packages (each package holding two cupcakes) become aligned with the position of the gripping assembly 50 when it is over the packages as shown in FIG. 6.

The gripping assembly, gripping the cupcake as previously described, will appear as shown in FIG. 2. The pneumatic cylinder 166 is actuated to move the rack 162 in an upward direction, rotating the pinion gears 160, and moving the gripping assembly 50 in an arcuate path to the position shown in FIG. 6. During the initial portion of this movement, the cam levers 120 are simply pushed out of the way by the cam following heads 72. As soon as they have been cleared by the cam following heads 72, the cam levers 120 are returned to their original positions by the springs 130.

When the gripping assembly 50 reaches the receiving station as shown in FIG. 6, the disengagement levers 74 contact the releasing screws 184, so that the engagement pin 98 is moved in a downward direction, spreading the rods 78, together with their associated discs 88, 90 and elastic bands 92, away from one another so that the cupcakes 12 are dropped into the packages 28. After the cupcakes have been released, the gripping assembly 50 is returned to the transfer station, as shown in FIG. 5, for the receipt of more cupcakes, as previously described.

Because each packaging station 22 employs two transfer apparatus 10, as shown in FIG. 1, suitable interconnecting means are provided to insure that they operate together.

Although the foregoing description has been in connection with a machine for handling cupcakes, it will be understood by those skilled in the art that the article transfer apparatus of the present invention may be utilized to handle any number of articles, and is particularly adapted to the handling of fragile articles such as bakery items.

Obviously, many modifications and variations of the invention as hereinbefore set forth will occur to those skilled in the art, and it is intended to cover in the appended claims all such modifications and variations as fall within the true spirit and scope of the invention.

I claim:
1. Improved packaging apparatus comprising:
   conveyor means for conveying articles to a transfer station;
   a plurality of gripping means positioned to receive a plurality of articles from said conveyor means, said gripping means comprising oppositely disposed elastic bands for gripping the sides of said articles;
   engagement means associated with each of said gripping means for displacing said elastic bands toward one another to grip articles at said transfer station in a predetermined spatial relationship with respect to one another;
   sensor means for sensing the presence of an article in each of said gripping means, said sensor means being operatively connected to actuate said engagement means;
   transfer means for transferring said gripping means from said transfer station to a receiving station; and
   disengagement means for moving said elastic bands away from one another at said receiving station, whereby to release articles engaged by said gripping means.

2. The apparatus as defined in claim 1 wherein said sensor means comprise a light source and a photocell positioned so that a light beam from said source to said photocell is interrupted by an article at said gripping means.

3. The apparatus as defined in claim 1 wherein said receiving station comprises package conveyor means.

4. The apparatus as defined in claim 3 wherein said gripping means are moved from said transfer station to said receiving station through an arcuate path.

5. The apparatus as defined in claim 3 wherein said gripping means each comprise a pair of oppositely disposed elastic bands each band being carried by a pair of generally horizontal discs having locating grooves for said bands at the circumference thereof.

6. Improved apparatus for packaging cupcakes and the like comprising:
   conveyor means for conveying cupcakes to a transfer station;
   a plurality of gripping means positioned to receive a plurality of cupcakes from said conveyor means, said gripping means comprising oppositely disposed elastic bands each carried by a pair of generally horizontal discs having locating grooves for said bands at the circumference thereof;
   engagement means associated with each of said gripping means for displacing said elastic bands toward one another to grip said cupcakes at said transfer station in a predetermined spatial relationship with one another;
   sensor means for sensing the presence of a cupcake at each of said gripping means, said sensor means being operatively connected to actuate said engagement means;

transfer means for transferring said gripping means from said transfer station to a cupcake package at a receiving station; and disengagement means for moving said elastic bands away from one another at said receiving station, whereby to release articles engaged by said gripping means and to drop them into said package.

7. The apparatus as defined in claim 6 wherein said gripping means are moved from said transfer station to said receiving station through an arcuate path.

8. The apparatus as defined in claim 6 wherein said sensing means comprise a light source and a photocell positioned so that a light beam from said source to said photocell is interrupted by an article at said gripping means.

* * * * *

UNITED STATES PATENT AND TRADEMARK OFFICE
CERTIFICATE OF CORRECTION

PATENT NO. : 3,934,702

DATED : January 27, 1976

INVENTOR(S) : ALAN KENT SNYDER ET AL.

It is certified that error appears in the above-identified patent and that said Letters Patent are hereby corrected as shown below:

Column 1, line 53, of printed patent, "U.S. Pat. No. 215,271 should read --U.S. Design Patent No. Des. 215,271--.

Column 4, line 21, of printed patent, "eah" should read --each--

Signed and Sealed this twenty-seventh Day of April 1976

[SEAL]

Attest:

RUTH C. MASON
*Attesting Officer*

C. MARSHALL DANN
*Commissioner of Patents and Trademarks*